US005329685A

United States Patent [19]

Gillespie

[11] Patent Number: 5,329,685

[45] Date of Patent: Jul. 19, 1994

[54] PNEUMATICALLY-POWERED BATTERING RAM

[76] Inventor: Donald E. Gillespie, 4629 Platt Rd., Ann Arbor, Mich. 48108

[21] Appl. No.: 80,661

[22] Filed: Jun. 18, 1993

[51] Int. Cl.[5] .......... B23P 19/04

[52] U.S. Cl. .......... 29/254; 29/275; 173/90

[58] Field of Search .......... 227/9, 10; 173/90, 206, 173/209; 29/254, 239, 275, 278; 273/67 R, 84 R

[56] References Cited

U.S. PATENT DOCUMENTS

| | | | |
|---|---|---|---|
| 4,595,134 | 6/1986 | Jochum | 227/9 |
| 4,681,171 | 7/1987 | Kee et al. | 173/90 |
| 4,783,053 | 11/1988 | Yirmiyahu et al. | 29/239 |
| 4,850,437 | 7/1989 | Sudnishnikov et al. | 173/90 |
| 4,871,034 | 10/1989 | Schmidt | 173/90 |
| 5,067,237 | 11/1991 | Holder | 30/1 |
| 5,167,043 | 12/1992 | Lopez et al. | 29/254 X |
| 5,177,850 | 1/1993 | Hull et al. | 29/254 |

*Primary Examiner*—Rinaldi I. Rada
*Attorney, Agent, or Firm*—Krass & Young

[57] ABSTRACT

A pneumatically-powered battering ram for striking objects quickly and effectively with an initial high striking velocity resulting in an increased peak force effective in breaking the target object. The battering ram includes an elongated hollow housing containing a mass to be propelled, preferably a piston, and a supply of compressed gas, preferably carbon dioxide disposed within the housing. A valve mechanism releases a portion of the compressed gas into a charge cavity located between the piston and the supply of compressed gas. A sear mechanism holds the piston in place against the pressure of the compressed gas in the charge cavity. When the battering ram is swung at an object such as a door, a trigger mechanism releases the sear mechanism which in turn releases the piston. The piston is then accelerated forward by the compressed gas charge. Consequently, as the ram reaches the door, so does the piston which is traveling at a much higher velocity than could be obtained solely by manual swinging. As a result, the peak force initially imparted upon the door is greater and the door is broken down in a quick and efficient manner.

16 Claims, 2 Drawing Sheets

PNEUMATICALLY-POWERED BATTERING RAM

FIELD OF THE INVENTION

This invention relates generally to the field of battering rams and more particularly to a pneumatically-powered battering ram.

BACKGROUND OF THE INVENTION

For centuries, battering rams have been used to break down gates, walls and doors to force entrance. In ancient times, a battering ram was often nothing more than a heavy wooden beam which was repeatedly pounded by a large group of soldiers against city gates or walls to forcibly gain entrance.

In modern times, variations of the ancient battering ram are still used when circumstances require quick and efficient entrance, such as when a fire fighter must gain access to the interior of a burning building or a law enforcement official must break down a door to apprehend a criminal and/or obtain evidence before it can be destroyed. For example, U.S. Pat. No. 4,681,171 of Kee et al. discloses a battering ram operable by one person which includes a concrete-filled tube with an epoxy resin contact face. U.S. Pat. No. 5,067,237 of Holder discloses yet another type of battering ram which includes a pointed end with barbs to enable the door to be hooked and pulled outward. Sledge hammers have also been employed to achieve the same result.

However, most doors require many blows from such means before entry is achieved. Furthermore, such battering rams are often heavy, cumbersome and difficult to efficiently manipulate. The resultant delay in gaining entry is undesirable for both efficiency and safety reasons. For example, in the law enforcement context, speed and the element of surprise are essential to the safety of law enforcement personnel and the collection and recovery of evidence. Otherwise, while the officers are in the process of breaking down the door, the occupants may arm themselves, destroy evidence, escape, or even fire through the door at the officers attempting to break it down. Of primary importance is the avoidance of casualties. Accordingly, the door must be breached before any of the occupants realize what has happened.

The delay in breaking down the door when using prior art battering rams can be at least partially explained by considering the physics involved in breaking a door with a ram. The ram has a certain mass which is accelerated to a striking velocity by the individuals swinging it. The kinetic energy of the moving mass is applied to the door when the head of the ram contacts the door. Significantly, the force is not applied to the door all at once: the ram comes to a stop during a finite amount of time during which the energy transfer to the door occurs. In part, the speed of the ram determines the total force applied to the door; the speed of the energy transfer determines the peak force on the door. A higher peak force is more effective at breaking doors because for every door there is a threshold force required to begin the process of tearing and ripping that destroys the integrity of the door. Once the force applied is sufficient to start destroying the integrity of the door, it takes very little extra force to complete the job.

The peak force applied to the door is ultimately limited by the velocity with which the ram strikes the door. Increasing the impact velocity of the ram, for the same total energy, is more effective in breaking the door. To bring the total energy available to bear on the door in as short a time as possible requires a higher striking velocity. Thus, there is a need for an improved battering ram which can quickly and efficiently break down doors by providing a higher striking velocity to increase the peak force initially applied to the door.

SUMMARY OF THE INVENTION

Disclosed and claimed herein is a pneumatically-powered battering ram for striking objects such as doors. The battering ram includes a hollow elongated housing having an object-striking end and a second opposed end. The interior of the housing comprises a compartment having a first portion proximate the object-striking end of the battering ram and a second compartment portion proximate the opposed end of the housing. A mass is disposed within the first portion of the compartment. In .the preferred embodiment, the mass is a piston having a head, a connecting rod, and a base with the head of the piston pointed toward the object-striking end of the housing. The second portion of the compartment contains a supply of a compressed gas disposed and sealed therein. Optionally, the compressed gas may be contained in a separate tank which is disposed within the second portion of the compartment. Preferably, the compressed gas is carbon dioxide. A valve means is provided which operates to release a portion of the compressed gas from the second portion of the housing into a charge cavity located between the mass and the second portion of the housing. A trigger mechanism responsive to contact with the object stricken is affixed to the object-striking end of the ram housing. A first end of the trigger mechanism protrudes past the object-striking end of the housing and a second end of the trigger mechanism is releasably attached to the mass.

To operate the battering ram to knock down an object such as a door, a portion of the compressed gas is released from the second portion of the housing into the charge cavity via the valve means. The battering ram is then swung at the door such that the first protruding end of the trigger mechanism hits the door causing the second end of the trigger mechanism to release the mass, thus allowing the mass to be propelled by the compressed gas through the object-striking end of the battering ram. Consequently, both the mass and the object-striking end of the battering ram housing strike the door together with a combined striking velocity which imparts a higher peak force for quickly and efficiently breaking down the door.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
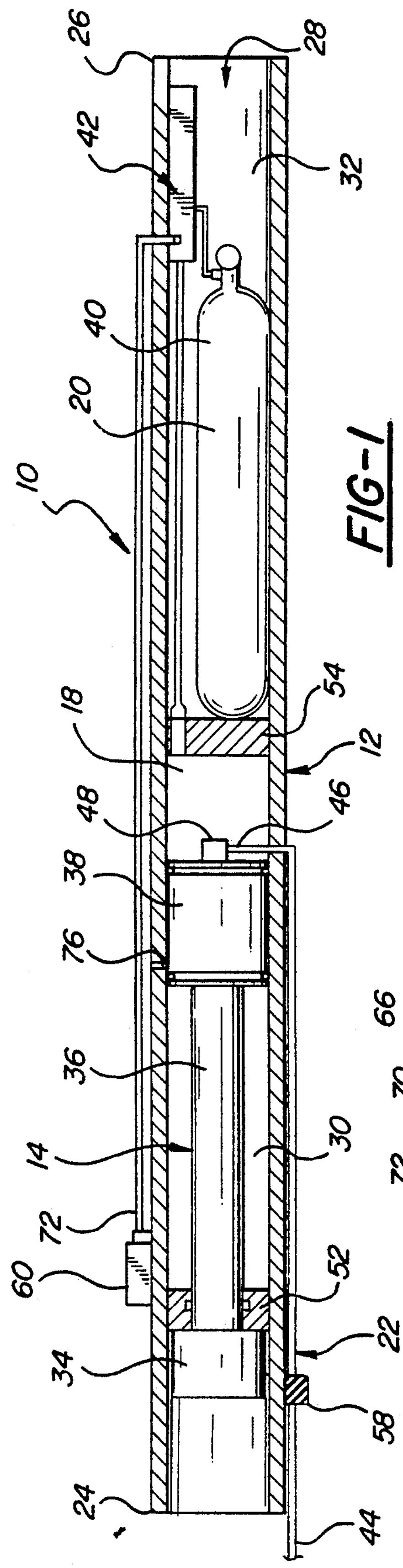
FIG. 1 is a cross-sectional side view of a pneumatically-powered battering ram constructed according to the teachings of the present invention showing the battering ram in an armed position.

Throughout the following detailed description, like reference numerals are used to refer to the same element of the invention shown in multiple figures thereof. Referring now to the drawings and, in particular to FIGS. 1 and 2, there is shown a pneumatically-powered battering ram 10 according to the present invention. The battering ram 10 includes a housing 12, a mass which is preferably a piston 14, a charge cavity 18, a supply of compressed gas 40 and a trigger mechanism 22. The housing 12 has a first object-striking end 24, a second opposed end 26, and an internal compartment 28. The internal compartment 28 includes a first portion 30 proximate the object-striking end 24 of the housing 12 and a second portion 32 proximate the second opposed end 26 of the housing 12. The piston 14 is disposed within the first portion 30 of the internal compartment 28 of the housing 12 proximate the object-striking end 24. The piston 14 includes a head 34, a connecting rod 36 and a base 38; the piston head 34 is disposed toward the object-striking end 24 of the housing 12.

The housing 12 may further include bulkheads 52, 54 and 56 disposed within the internal compartment 28. Bulkhead 52 is located proximate the object-striking end 24 of the battering ram 10 between the piston head 34 and the piston base 38. When the battering ram 10 is in an armed position ready to be fired, the piston head 34 is in close proximity to the bulkhead 52. Bulkhead 54 is located between the charge cavity 18 and the second end 26 of the housing 12. An aperture 88 extends through bulkhead 54 and operates in conjunction with the valve means 42 to fill the charge cavity 18 with compressed gas 40. Bulkhead 56 is located proximate the second opposed end 26 of the housing 12 and seals the second portion 32 of the internal compartment 28.

As shown in FIG. 1, a tank 20 may be disposed within the second portion 32 of the housing 12 to store the supply of compressed gas 40. Alternatively, the compressed gas 40 may be disposed directly into the second portion 32 of the housing 12 which is then sealed by bulkhead 56 to keep the gas 40 under pressure.

Figure 2:
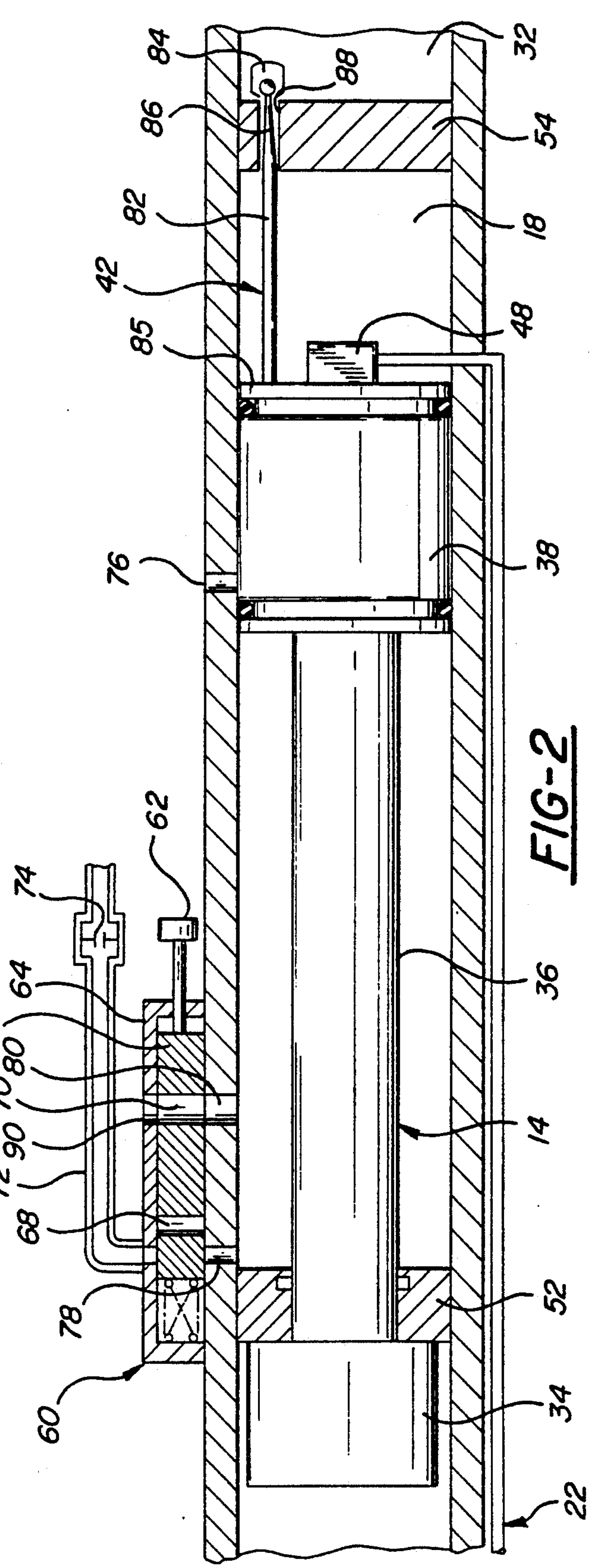
FIG. 2 is a schematic cross-sectional side view of a pneumatically-powered battering ram constructed according to the teachings of the present invention.

The battering ram 10 further includes a valve means 42 which operates to release a portion of the compressed gas 40 into the charge cavity 18. As best seen in FIG. 2, the preferred embodiment of the valve mechanism 42 includes an actuator rod 82 and a ball 84. The actuator rod 82 has a first end 85 affixed to the base 38 of the piston 14 and a second tapered end 86. The second tapered end 86 fits within an aperture 88 which extends through bulkhead 54, leaving sufficient room around the rod 82 for the gas 40 to enter the charge cavity 18 when desired. The ball 84 covers the aperture 88 in the bulkhead 54 and prevents the flow of gas until the charge cavity 18 needs to be refilled.

Figure 4:
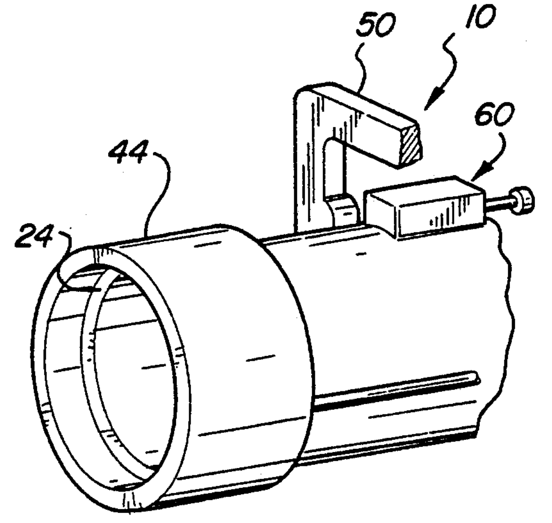
FIG. 4 is a perspective view of a pneumatically-powered battering ram with an alternative embodiment of the first end of the trigger mechanism constructed according to the teachings of the present invention.
Figure 5:
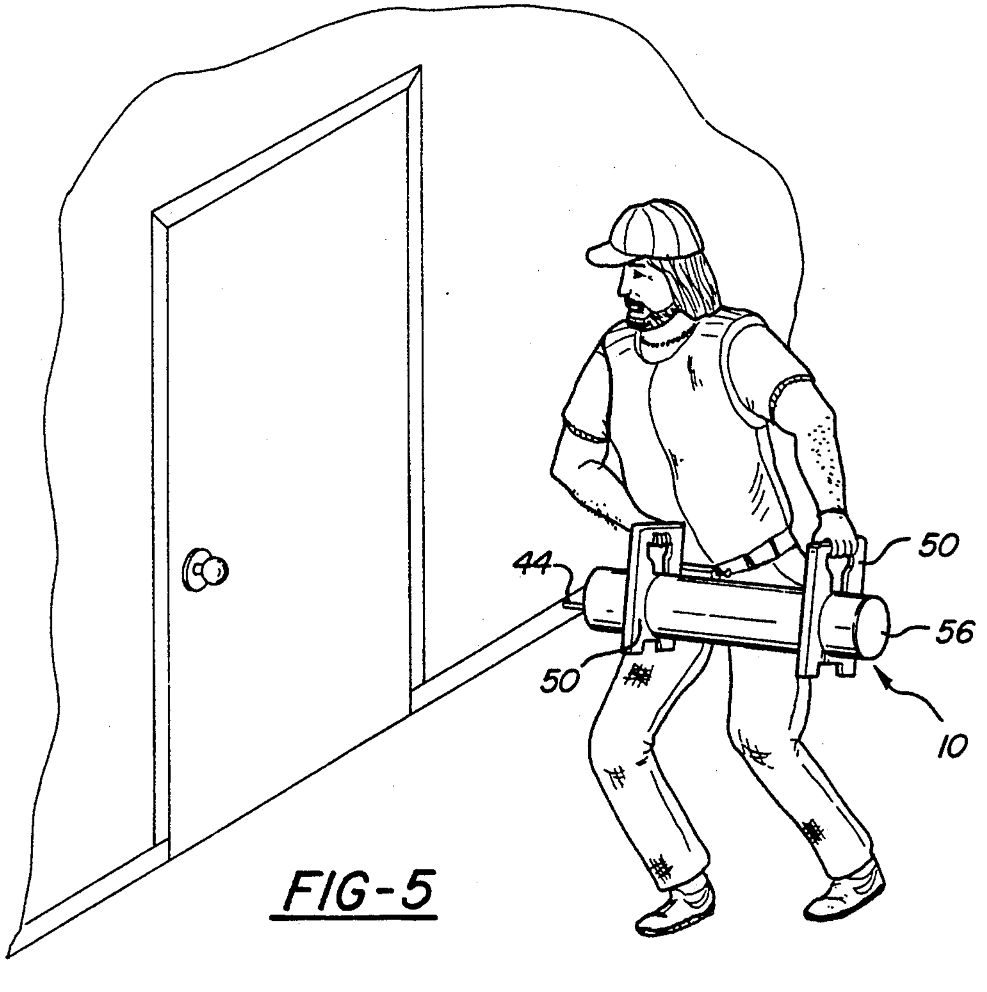
FIG. 5 is a perspective view of a pneumatically-powered battering ram constructed according to the teachings of the present invention being used by an individual to strike a door.

A trigger mechanism 22 is affixed to the object-striking end 24 of the battering ram housing 12. The trigger mechanism 22 has a first end 44 which protrudes past the object-striking end 24 of the housing 12 and a second end 46 which is releasably attached to the base 38 of the piston 14. The first end 44 of the trigger mechanism 22 may be either a collar 44*a* surrounding the perimeter of the object-striking end 24 of the housing 12 such as shown in FIG. 4 or a rod 44*b* protruding past the object-striking end 24 such as shown in FIGS. 1 and 5. The second end 46 of the trigger mechanism 22 preferably comprises a sear mechanism 48. The sear mechanism 48 is designed to abruptly release the piston 14 which is being held against the large restrained force of the compressed gas by the action of a much smaller force. The classic use of a sear mechanism is the trigger-firing pin mechanism of a gun. In a gunlock, the sear is a catch that holds the hammer of a gunlock at cock or half cock. When the trigger is activated, the sear releases the hammer, causing the gun to fire. Similarly, in the present invention, the sear mechanism 48 is a catch that holds the piston 14 of the battering ram 10 in an armed position until the trigger mechanism 22 is activated, causing the piston 14 to fire out of the object-striking end 24 of the battering ram 10. Vent 76 in the housing 12 allows the compressed gas 40 disposed in the charge cavity 18 to be vented after the sear mechanism 48 is released and the piston 14 is brought to the desired velocity.

Figure 3:
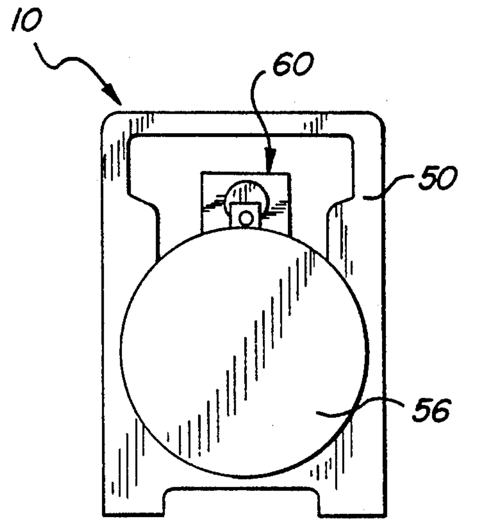
FIG. 3 is a back perspective view of a pneumatically-powered battering ram with a handle constructed according to the teachings of the present invention.

To assist in the swinging of the battering ram 10, at least one handle 50 may be attached to the housing 12. In the preferred embodiment, best shown in FIGS. 3 and 5, the handles 50 surround the housing 12 such that when the battering ram 10 is not in use, it may be stored or transported without rolling.

In the preferred embodiment, the battering ram 10 further includes a reset mechanism 60 which uses compressed gas 40 from valve means 42 through feed pipe 72 to return or reset the piston 14 to an armed position. The reset mechanism 60 is preferably attached to the exterior of the housing 12 of the battering ram 10 proximate a handle 50. The reset mechanism 60 includes a reset valve cylinder 64 having an exhaust port 90 extending therethrough, a reset valve piston 66 with a piston feed port 68 and a piston vent port 70 extending therethrough, a feed pipe 72, a flow rate restrictor 74, and a reset knob 62. In embodiments of the battering ram 10 which include the reset mechanism 60, vents 78 and 80 are provided in the housing 12 to correspond and align with the piston feed port 68 and the piston vent port 70, respectively, of the reset mechanism 60. Optionally, anti-rotation guides 58 disposed at predetermined intervals along the exterior surface of the housing 12 may be provided to hold the trigger mechanism 22 and/or the feed pipe 72 in place and to prevent rotation.

As shown in FIG. 2, the battering ram 10 is in armed position and the piston vent port 70 is aligned with the vent 80 in the housing 12 and the exhaust port 90 in the valve cylinder 64. After the battering ram 10 has been fired, piston 14 must be returned to the armed position. The reset knob 62 is pressed, thus pushing the valve piston 66 within the valve cylinder 64 such that feed port 68 is aligned with vent 78 in the housing 12. The compressed gas 40 then travels through the feed pipe 72, the flow rate restrictor 74 and the aligned feed port 68 and vent 78 into the portion of the internal compartment 28 located between bulkhead 52 and the base 38 of the piston 14 to force the piston 14 to return to the armed position. The flow rate restrictor 74 functions to limit the gas flow and controls how hard the piston 14 will reset. Vent port 76 through housing 12, which was uncovered by the base 38 after firing, allows gas to escape from behind the base 38 during the return stroke. Upon return of the piston 14 to the armed position the sear mechanism 48 reengages the piston 14 and the charge cavity 18 is refilled by the action of the actuator rod 82 and the ball 84. The reset knob 62 is released by the user realigning the piston vent port 70 with the vent 80 in the housing 12 and the battering ram 10 is armed and ready.

Safety features may also optionally be incorporated into the battering ram 10. For example, over-pressure relief valves may be provided in the tank 20 and the charge cavity 18. A sear lock may also be provided to prevent the battering ram 10 from being fired when it is being stored. In addition, other optional features (not shown in the figures) include a pressure regulator of the type known in the art which accepts either liquid or gas which may be immersed in the compressed gas 40 or otherwise placed in the tank 20 or the sealed second portion 32 of the housing 12 to assure constant pressure in the charge cavity 18 and/or to allow the striking pressure of the compressed gas 40 released into in the charge cavity 18 to be adjusted to accommodate different striking situations.

To operate the battering ram 10 to knock down an object such as a door, a portion of the compressed gas 40 is released from the tank 20 (or the sealed second portion 32 of the housing 12) into the charge cavity 18 via the valve means 42. The piston 14 is restrained from movement against the pressure in the charge cavity 18 by the sear mechanism 48. The first end 44 of the trigger mechanism 22 protrudes from the object-striking end 24 of the battering ram 10 towards the door. The individual handling the ram 10 swings it toward the door in the conventional way. When the protruding end 44 of the trigger mechanism 22 reaches the door, the base 38 of the piston 14 is released by the sear mechanism 48. Upon release of piston 14 by the sear mechanism 48, the piston 14 is propelled at a high velocity through the object-striking end 24 of the housing 12 by the force of the compressed gas 40 contained in the charge cavity 18. Consequently, the object-striking end 24 of the housing 12 reaches the door together with the head 34 of the piston 14, with the piston 14 traveling at a much higher velocity than can be obtained by swinging alone. This high velocity brings the peak force on the door to a much higher level because the energy transfer to the door occurs in a shorter time. The total energy brought to bear on the door is also increased by the power assistance from the expanding compressed gas, preferably carbon dioxide. Thus, the battering ram 10 imparts a higher peak force and greater total energy for quickly and efficiently breaking down the door.

As with a conventional ram, the higher the weight of the battering ram 10, the better it will be at destroying doors, provided that the total weight does not exceed that which the individual handling the ram can carry and maneuver effectively. Thus, in an embodiment of the present invention intended to be operated by one individual, the battering ram 10 should weigh approximately sixty pounds in order to be maneuvered quickly and easily yet still effectively.

As the piston 14 is forced forward by the expanding gas in the charge cavity 18 there is an equal and opposite recoil force on the housing 12. In order for the individuals operating the battering ram 10 to be able to maintain control of the ram 10 during the swing, this recoil velocity must be kept within acceptable limits. In the preferred embodiment, the housing 12 weighs five to ten times as much as the piston 14 and the recoil velocity may therefore be as little as 1/10 the piston velocity. This recoil acts to slow the housing 12 as it is swung toward the door. A five ft/s (feet per second) ram swing velocity is considered attainable, so a final piston velocity of 55 ft/s (within the housing 12) would recoil the housing 12 to a complete stop at the moment of impact. However, the moving piston 14 will retain the velocity, and more importantly, the kinetic energy of the housing 12. The combined energies of the housing 12 and piston 14 are both applied to the door, thus the gas pressure assisted energy that can be applied to the door is approximately twelve times greater than that which can be applied by two individuals using a conventional ram.

As previously mentioned, although other types of compressed gas (such as air) may be used to fill tank 20, carbon dioxide gas is preferred. Carbon dioxide-filled tanks 20 typically contain liquid with a vapor pressure of about 850 psi at 70 degrees Fahrenheit which is an adequate pressure range for the task at hand. An eight ounce carbon dioxide tank 20, discharged into the charge cavity 18 at 500 psi, provides approximately fourteen charges before needing to be replaced or refilled.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as falling within the spirit and broad scope of the claims.

I therefore claim:

1. A pneumatically-powered battering ram for striking objects, said battering ram comprising:

a hollow elongated housing having a first object-striking end, a second opposed end, an outer surface, and an internal compartment having a first portion proximate the object-striking end, and a second portion proximate the second opposed end;

a mass disposed within the first portion of said housing;

a charge cavity disposed between said mass and the second portion of said housing;

a compressed gas disposed and sealed within the second portion of said housing;

a valve means associated with said second portion of said housing to regulate the flow of said compressed gas from said second portion of said housing into said charge cavity; and a trigger mechanism affixed to said object-striking end of said housing, said trigger mechanism having a first end which protrudes past the object-striking end and a second end releasably attached to said mass, said trigger mechanism being responsive to contact with the object stricken whereby when the trigger mechanism is activated, said mass is propelled through the object-striking end of said housing to strike said object.

2. The pneumatically-powered battering ram of claim 1 wherein said mass comprises a piston.

3. The pneumatically-powered battering ram of claim 1 wherein the first end of said trigger mechanism comprises a rod protruding past said object-striking end of said housing.

4. The pneumatically-powered battering ram of claim 1 wherein the first end of said trigger mechanism comprises a collar surrounding the object-striking end of said housing.

5. The pneumatically-powered battering ram of claim 1 wherein said second end of said trigger mechanism comprises a sear mechanism.

6. The pneumatically-powered battering ram of claim 1 wherein said compressed gas is carbon dioxide.

7. The pneumatically-powered battering ram of claim 1 further comprising at least one handle attached to the outer surface of said housing.

8. The pneumatically-powered battering ram of claim 1 further comprising a reset mechanism affixed to said housing to activate the valve means to refill the charge cavity with another portion of compressed gas.

9. The pneumatically-powered battering ram of claim 8 wherein said housing further includes a first vent and a second vent and wherein said reset mechanism comprises a reset valve cylinder affixed to the outer surface of said housing over said first vent and said second vent in said housing, said valve cylinder having an exhaust port extending therethrough, a reset valve piston disposed within said valve cylinder, said valve piston having a piston feed port and a piston vent port extending through said piston such that in a first position said piston vent port is in alignment with said first vent and said exhaust port and in a second position said piston feed port is in alignment with said second vent, a feed pipe connecting said reset mechanism to said valve means, said feed pipe having a flow rate restrictor, and a reset knob in operative relationship with said valve piston such that when said reset knob is pressed, said piston feed port aligns with said second vent in said housing in said second position and gas travels through said feed pipe into the internal compartment of said housing to return the battering ram to an armed position.

10. A pneumatically-powered battering ram for striking objects, said battering ram comprising:

a hollow elongated housing having a first object-striking end, a second opposed end, an outer surface, and an internal compartment having a first portion proximate the object-striking end, and a second portion proximate the second opposed end;

a first bulkhead disposed within the first portion of said internal compartment and a second bulkhead disposed within the internal compartment between said first portion and said second portion;

a piston having a head and a base, said piston being disposed within the first portion of said housing such that said head of said piston is between said first bulkhead and said object-striking end of said housing;

a charge cavity disposed between the base of said piston and said second bulkhead;

a tank filled with a compressed gas disposed within the second portion of said housing between said second bulkhead and said second opposed end of said housing, said tank having a valve means associated with said second portion of said housing to regulate the flow of said compressed gas from said second portion of said housing into said charge cavity; and a trigger mechanism having a first end affixed to said object-striking end of said housing and a second end having a sear mechanism releasably engaging the base of said piston and retaining said piston in said housing whereby when the first end of said trigger mechanism strikes an object, said sear mechanism releases the base of said piston, causing said piston to be propelled through the object-striking end of said housing to strike the object.

11. The pneumatically-powered battering ram of claim 10 wherein the first end of said trigger mechanism comprises a rod protruding past said object-striking end of said housing.

12. The pneumatically-powered battering ram of claim 10 wherein the first end of said trigger mechanism comprises a collar surrounding the object-striking end of said housing.

13. The pneumatically-powered battering ram of claim 10 wherein said compressed gas is carbon dioxide.

14. The pneumatically-powered battering ram of claim 10 further comprising at least one handle attached to the outer surface of said housing.

15. The pneumatically-powered battering ram of claim 10 further comprising a reset mechanism affixed to said housing to activate the valve means to refill the charge cavity with another portion of compressed gas.

16. The pneumatic battering ram of claim 15 wherein said housing further includes a first vent and a second vent and wherein said reset mechanism comprises a reset valve cylinder affixed to the outer surface of said housing over said first vent and said second vent in said housing, said valve cylinder having an exhaust port extending therethrough, a reset valve piston disposed within said valve cylinder, said valve piston having a piston feed port and a piston vent port extending through said piston such that in a first position said piston vent port is in alignment with said first vent and said exhaust port and in a second position said piston feed port is in alignment with said second vent, a feed pipe connecting said reset mechanism to said valve means, said feed pipe having a flow rate restrictor, and a reset knob in operative relationship with said valve piston such that when said reset knob is pressed, said piston feed port aligns with said second vent in said housing in said second position and gas travels through said feed pipe into the internal compartment of said housing to return the battering ram to an armed position.

* * * * *